United States Patent [19]
Maldavs

[11] Patent Number: 6,016,835
[45] Date of Patent: Jan. 25, 2000

[54] HYDRAULIC QUICK DISCONNECT COUPLING

[75] Inventor: Ojars Maldavs, Lincoln, Nebr.

[73] Assignee: Parker-Hannifin Corporation, Cleveland, Ohio

[21] Appl. No.: 09/027,711

[22] Filed: Feb. 23, 1998

[51] Int. Cl.[7] .................................................. F16K 37/22
[52] U.S. Cl. ................................ 137/614.05; 137/614.06; 137/614; 251/149.6
[58] Field of Search ................... 137/614.05, 614.03, 137/614.06, 614.04, 614, 614.02; 251/149, 149.6, 149.9

[56] References Cited

U.S. PATENT DOCUMENTS

| | | |
|---|---|---|
| Re. 28,334 | 2/1975 | Cranage . |
| Re. 34,871 | 3/1995 | Spalink et al. . |
| 695,839 | 3/1902 | Roberts et al. . |
| 950,263 | 2/1910 | Harpster . |
| 1,107,041 | 8/1914 | Cook . |
| 1,580,694 | 4/1926 | Smith . |
| 2,184,413 | 12/1939 | Chiesa et al. . |
| 2,425,500 | 8/1947 | Wiggins . |
| 2,471,237 | 5/1949 | Pasturczak . |
| 2,543,590 | 2/1951 | Swank . |
| 2,637,572 | 5/1953 | Bruce . |
| 2,670,751 | 3/1954 | Wilson . |
| 2,679,408 | 5/1954 | Jacobi et al. . |
| 2,689,138 | 9/1954 | Schewer . |
| 2,727,759 | 12/1955 | Elliott . |
| 2,735,696 | 2/1956 | Omon et al. . |
| 2,887,124 | 5/1959 | Mehl . |
| 2,898,963 | 8/1959 | Courtot . |
| 2,905,485 | 9/1959 | Zajac . |
| 3,023,030 | 2/1962 | Torres . |
| 3,036,595 | 5/1962 | Rogers . |
| 3,039,794 | 6/1962 | De Cenzo . |
| 3,049,148 | 8/1962 | Richardson . |
| 3,052,488 | 9/1962 | Bruning . |
| 3,092,153 | 6/1963 | Stoyke . |
| 3,120,968 | 2/1964 | Calvin . |
| 3,130,749 | 4/1964 | Wittren . |
| 3,211,178 | 10/1965 | Kiszko . |
| 3,213,884 | 10/1965 | Moyer et al. . |
| 3,215,161 | 11/1965 | Goodwin et al. . |
| 3,236,251 | 2/1966 | Hansen . |
| 3,348,575 | 10/1967 | Simak . |
| 3,466,054 | 9/1969 | Berg . |
| 3,477,468 | 11/1969 | Kopaska ............................. 137/614.05 |

(List continued on next page.)

FOREIGN PATENT DOCUMENTS

| | | |
|---|---|---|
| 1951367 | 7/1970 | Germany . |
| 2 138 213 | 2/1972 | Germany . |
| 2 234 385 | 1/1973 | Germany . |

(List continued on next page.)

*Primary Examiner*—Denise L. Ferensic
*Assistant Examiner*—Joanne Y. Kim
*Attorney, Agent, or Firm*—Christopher H. Hunter

[57] ABSTRACT

A female coupler includes a housing adapted to receive a male coupler. A port is provided in the housing for supplying pressurized fluid to the bore. A cylindrical valve body is disposed in the bore and is axially movable in the housing. The valve body includes an interior annular valve seat. A cylindrical poppet valve is normally spring biased against the valve seat and includes a projection adapted to engage a valve member in the male coupler. A cylindrical piston is closely received about the poppet valve and disposed between the poppet valve and the valve body. The piston includes an axial passage which fluidly interconnects an inlet passage of the valve body to the rear surface of the piston. When the piston moves forwardly, the piston engages an enlarged head on the poppet valve. The fluid passage through the piston facilitates moving the piston, and hence the poppet valve forwardly against the valve member and the male coupler when there are excessive pressures contained in the male coupler. The piston can also include an annular wiper seal which is sealable against a relief poppet and poppet guide assembly to allow fluid to flow rearwardly to the rear surface of the piston, but prevent flow forwardly through the female coupler.

20 Claims, 7 Drawing Sheets

6,016,835 Page 2

U.S. PATENT DOCUMENTS

| | | | |
|---|---|---|---|
| 3,482,602 | 12/1969 | Jarnagan et al. | 137/614.03 |
| 3,490,491 | 1/1970 | Kopaska . | |
| 3,500,859 | 3/1970 | Pearson . | |
| 3,508,580 | 4/1970 | Snyder, Jr. . | |
| 3,530,887 | 9/1970 | Stratman . | |
| 3,613,726 | 10/1971 | Torres . | |
| 3,645,294 | 2/1972 | Allread . | |
| 3,680,591 | 8/1972 | Vik . | |
| 3,730,221 | 5/1973 | Vik . | |
| 3,791,411 | 2/1974 | Bogeskov et al. | 137/614.02 |
| 3,809,122 | 5/1974 | Berg . | |
| 3,861,645 | 1/1975 | Norton . | |
| 3,874,411 | 4/1975 | Vik . | |
| 3,881,514 | 5/1975 | Berg . | |
| 3,901,276 | 8/1975 | Daughetee et al. . | |
| 3,939,869 | 2/1976 | Clarke et al. . | |
| 3,985,394 | 10/1976 | Rolfes . | |
| 4,017,055 | 4/1977 | Daughtee et al. . | |
| 4,047,587 | 9/1977 | Anstey . | |
| 4,074,698 | 2/1978 | Hobson et al. . | |
| 4,077,433 | 3/1978 | Maldavs . | |
| 4,124,228 | 11/1978 | Morrison . | |
| 4,150,691 | 4/1979 | Maldavs . | |
| 4,181,150 | 1/1980 | Maldavs . | |
| 4,213,482 | 7/1980 | Gondek . | |
| 4,249,572 | 2/1981 | Shindelar et al. . | |
| 4,303,098 | 12/1981 | Shindelar . | |
| 4,347,870 | 9/1982 | Maldavs | 137/614.05 |
| 4,350,321 | 9/1982 | Berg . | |
| 4,398,561 | 8/1983 | Maldavs | 137/614.05 |
| 4,432,569 | 2/1984 | Wietecha . | |
| 4,540,021 | 9/1985 | Rogers . | |
| 4,543,994 | 10/1985 | Johnson et al. | 137/614.05 |
| 4,549,577 | 10/1985 | Kugler . | |
| 4,564,042 | 1/1986 | Ekman . | |
| 4,582,295 | 4/1986 | Kugler et al. . | |
| 4,592,387 | 6/1986 | Rogers . | |
| 4,597,413 | 7/1986 | Buseth . | |
| 4,598,896 | 7/1986 | Maldavs . | |
| 4,779,645 | 10/1988 | Ekman . | |
| 4,844,513 | 7/1989 | St. Louis et al. . | |
| 4,881,573 | 11/1989 | Durant et al. . | |
| 4,913,190 | 4/1990 | Kugler . | |
| 4,936,346 | 6/1990 | Kugler . | |
| 5,076,324 | 12/1991 | Herman et al. . | |

FOREIGN PATENT DOCUMENTS

| | | |
|---|---|---|
| 2 304 796 | 8/1974 | Germany . |
| 28 53 962 | 6/1979 | Germany . |
| 30 15 485 A1 | 10/1981 | Germany . |
| 109393 | 8/1964 | Netherlands . |
| 366 102 | 4/1974 | Sweden . |
| 1 291 752 | 10/1972 | United Kingdom . |
| 1 375 692 | 11/1974 | United Kingdom . |
| 1 449 258 | 9/1976 | United Kingdom . |

HYDRAULIC QUICK DISCONNECT COUPLING

FIELD OF THE INVENTION

The invention relates to quick disconnect-type couplings for pressurized fluid lines.

BACKGROUND OF THE INVENTION

Quick disconnect-type couplings are used, for example, to connect hoses in hydraulic fluid lines. A typical application is on agricultural tractors to connect the tractor hydraulic system with attachable implements. The tractor typically includes one or more female coupler sockets, while the implements include one or more male coupler nipples. Pneumatic and other applications for such couplings are also well known.

Over the years changes have occurred in these systems which have required changes and performance improvements in the couplings. One early coupling design is shown in U.S. Pat. No. 4,077,433 where the female coupler includes a valve body slideable within the housing and a poppet valve internal to the valve body. The poppet valve is axially movable to engage a check valve in a male coupler when the male coupler is inserted into the female coupler. When low pressure is present in the male coupler, the poppet valve moves the check valve (ball valve) off its valve seat to allow flow from the female coupler to pass to the male coupler. When higher pressures are present in the male coupler, an internal passage in the poppet valve provides incoming fluid pressure to the rear surface of the poppet valve. Due to the differences in effective surface areas, the fluid pressure assists in driving the poppet valve against the check valve to move the check valve into an open position.

An improvement in this coupling is shown in U.S. Pat. No. 4,598,896, where a separate piston is located around the poppet valve. The piston can engage the poppet valve when moved forwardly. An internal passage in the poppet valve provides fluid pressure to the rear surface of the piston, which assists in driving the poppet valve against the check valve in the male coupler in high pressure situations. A spool is also provided around the piston and poppet valve in this coupling. The spool is fixed to the valve body and includes a port for exhausting pressure within the poppet valve. A retainer sleeve with a seal surrounds the port on the spool, and when the valve body slides within the housing (when the male coupler is inserted or removed), the port relieves the internal pressure in the female coupler to atmosphere.

In some cases, particularly when a pair of couplers are used to direct fluid to and from a hydraulic cylinder in an implement, a check valve mechanism is also provided in the female coupler to prevent the rapid backflow of pressure out of the female coupler when a pressure imbalance occurs within the system, such as during thermal expansion of the fluid caused by severe operating conditions, or when the implement is dragged over an uneven surface. In these situations, one of the female couplers can allow the check valve in an associated male coupler to close, which can cause a block in the system when the flow through the female coupler is desired.

To remedy this problem, some female couplers include a check valve mechanism which allows fluid to flow relatively unimpeded rearwardly to the rear surface of the piston, but which restricts or prevents fluid flow forwardly out of the female coupler. One known check valve mechanism includes a valve ball located within the internal bore of the piston which is spring-biased in both directions to allow fluid to flow rearwardly through the piston at a higher flow rate than forwardly through the piston.

The above couplings have received wide-spread acceptance in the marketplace for providing reliable, serviceable and effective components which operate under a variety of conditions. However, some of these couplings direct the fluid internally through the poppet valve to the rear surface of the piston. The flow path includes a radial hole formed in the side of the poppet valve, and a central bore extending axially through the poppet valve. A spring is commonly disposed within the central bore of the poppet valve for biasing the poppet valve against the valve seat. As the spring flexes, the spring can interfere with the flow through the radial hole, which can reduce or even temporarily interrupt the flow through the poppet valve. This can cause an uneven driving force of the piston against the poppet valve, which can be undesirable in certain applications.

Other of these couplings have the disadvantage that the check valve mechanism is complicated, can be time-consuming to assemble, and can require inspection and frequent repair or replacement if necessary to maintain consistent operation.

In any case, it is believed that there is a constant demand in the industry for novel and unique couplings which are reliable, easily serviceable, and operate under a variety of conditions.

SUMMARY OF THE PRESENT INVENTION

The present invention provides a novel and unique quick disconnect type coupling which is particularly useful for hydraulic and pneumatic fluid lines. The disconnect coupling is reliable, serviceable and operates under a variety of conditions. The coupling has direct and uninterrupted fluid communication with the rear surface of the piston, which provides consistent and uniform operation of the coupler over a range of operating conditions. The check valve mechanism in the coupler is also simple, reliable, and operates consistency over a long operating cycle.

According to the present invention, the female coupler includes a housing adapted to receive a male coupler. The housing includes a valve body slideable within the housing, and a poppet valve internal to the valve body. A piston surrounds the poppet valve to assist in moving the poppet valve against the check valve in the male coupler. Unlike prior female couplers, the flow passage to the rear surface of the piston is provided internally of the piston, rather than the poppet valve, which provides a direct and uninterrupted flow path to the rear surface of the piston to facilitate moving the poppet valve against the check valve in the male coupler. According to one form of the present invention, the flow path extends axially through a tubular main portion of the piston closely surrounding the poppet valve to an internal cavity bounded by an enlarged end portion of the piston, and then to the rear surface of the piston. The flow path can be provided through one or more bores formed axially through the tubular main portion of the poppet valve.

According to a further form of the present invention, a check valve is provided to prevent fluid rapidly flowing from the female coupler during pressure imbalances in the system. The check valve includes an annular wiper seal supported on the rear surface of the piston, and projecting radially inward therefrom. A poppet guide and relief poppet assembly is provided in the rear end of the valve body and extends axially forward internally of the piston and poppet valve. The poppet guide and relief poppet assembly includes a circumferential ridge along an exterior surface thereof. The wiper seal on the piston seals against the annular ridge on the assembly when the pressure drops in the female coupler and the piston moves forwardly within the coupler body. In this position, the wiper seal allows fluid to pass only rearward through the female coupler to the rear surface of the piston, and prevents a vacuum in the female coupler from allowing the male check valve to close. The fluid pressure behind the wiper seal is relieved to ambient only during connect and disconnect to allow the piston to move rearwardly.

In this form of the invention, a first, radially-extending flow path can be provided through the piston, and a second, axially-extending flow path can be formed between the piston and the poppet valve to the rear surface of the piston. The flow paths can be provided through one or more radial bores formed through the piston, and through an annular cavity defined between the piston and poppet valve. Alternatively, the piston can include only a single axial flow path as described above with respect to the first form of the present invention.

In either case, the flow path is separate from the poppet valve, which prevents the spring in the poppet valve from interfering with the flow of fluid to the rear surface of the piston. Again, the piston assists in moving the poppet valve axially within the valve body to engage the check valve in the male coupler, and thereby assists in opening the check valve in the male coupler, even under higher pressure conditions in the male coupler.

Further features and advantages of the present invention will become apparent to those skilled in the art upon reviewing the following specification and attached drawings.

DETAILED DESCRIPTION OF THE PREFERRED EMBODIMENT

Figure 1:
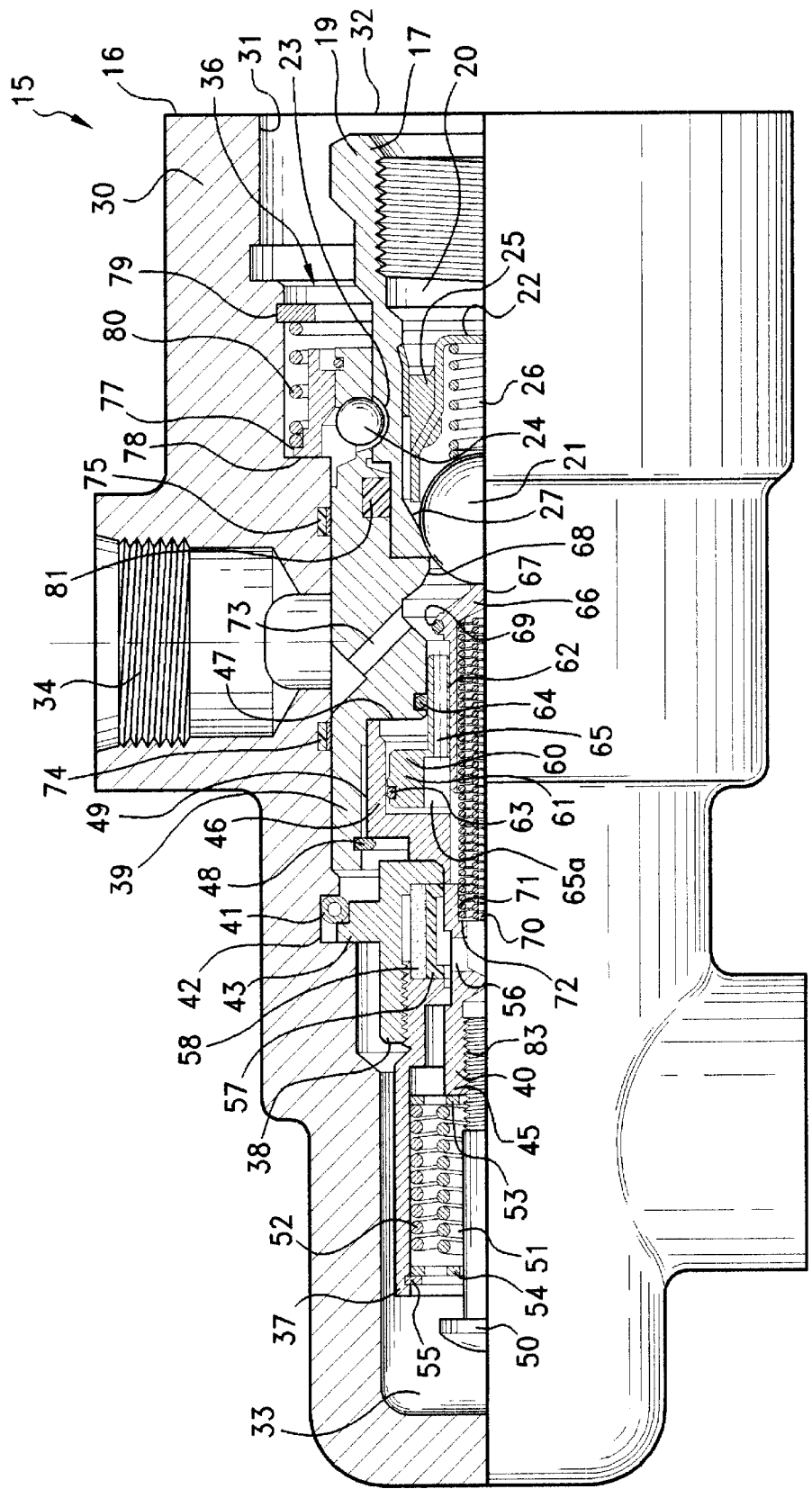
FIG. 1 is a side elevational view, partially in section, of a female coupling formed in accordance with the present invention, with a male coupling initially inserted within the female coupling.

Referring to the drawings, and initially to FIG. 1, a first form of a quick disconnect coupling of the present invention is indicated generally at 15, and includes a female coupling socket 16 and a male coupling nipple 17. The male coupling and female couplings have much of the same structure and function as shown in U.S. Pat. No. 4,598,896, which is incorporated herein by reference. The differences in the present invention and the above-identified patent will primarily be described below.

Male coupling 17, which is typically mounted on an agricultural implement, is a conventional, commercially-available male coupling and includes an outer tubular housing 19 having an internal bore 20 and a valve closure or ball 21 which is retained within a shroud 22. A groove 23 is provided in the housing for receiving the locking balls 24 of the female coupling. The shroud 22 is mounted within the male housing 19 by a spider support 25, and a spring 26 biases the ball 21 to the left against a seat 27 at the forward end of the housing 19.

The female coupling 16, which is typically mounted on the tractor, is constructed according to the principles of the present invention and includes an outer tubular housing 30 with an internal bore 31 which has an open end 32 and a closed end 33. The tractor hydraulic supply is connected to the female coupling by a port 34.

A cartridge assembly 36 is positioned within the bore of the female housing 30 and includes stationary tubular retainer sleeves 37 and 38, an axially slidable valve body 39 and an axially slidable spool 40. The retainer sleeves 37, 38 are threaded together and the sleeves are held stationary relative to the female housing 30 by a spirally-wound retainer spring 41. The spring 41 encircles the sleeve 38 and is positioned within an annular groove 42 in the inner surface of the female housing. The spring 41 is positioned between a radially-outwardly extending shoulder 43 on the sleeve 38 and the forward wall of the groove 42. The shoulder 43 is prevented from moving rearwardly by the rear wall of the groove 42.

The tubular spool 40 is slidable axially within the sleeves 37 and 38 and extends into the valve body 39. The spool 40 includes a rear portion 45 which extends into the sleeves 37, 38 and a radially enlarged forward end portion 46 which extends into the valve body 39. The right end (as illustrated) of the radially enlarged portion 46 engages an annular wall 47 on the valve body, and the spool is fixed relative to the valve body by an annular retainer ring 48. A passage 49 is positioned between the radially enlarged portion 46 of the spool and the valve body 39, assuring atmospheric pressure to the right side of enlarged portion 46 of the piston.

A screw 50 is screwed into the left end of spool 40, and a pair of concentric coil springs 51 and 52 are positioned in the space between the screw and the sleeve 37. The right end of each spring engages a ring 53 which abuts the left end of the spool 40, and the left end of each spring engages a ring 54 which is fixed relative to the sleeve 37 by a retainer ring 55.

The spool 40 is provided with a pair of radially-extending ports 56 to the right of the threaded hole for the screw 50. Ports 56 are sealed from the cavity of the female housing by a cylindrical elastomer seal 57. The seal 57 is retained in the annular space between the right end of the sleeve 37 and the right end of the sleeve 38, and preferably a cylindrical porous retainer 58 is positioned between the seal 57 and the outer wall of the sleeve 38. Porous retainer 58 can be made of coarse metal or other suitable material. Springs 51, 52 resiliently bias the spool to a neutral or center position where the ports 56 are normally sealed from the cavity of the female housing.

A tubular piston 60 is slidably mounted within the radially enlarged forward end 46 of the spool 40 and within the valve body 39. The piston 60 includes a radially enlarged end portion 61 which can abut the wall 47 of the valve body 39, and a reduced diameter tubular main portion 62 which slides within the valve body 39. Seals 63 and 64 on the piston and valve body, respectively, prevent fluid leakage between the piston, valve body and spool.

Piston 60 includes at least one, and preferably six through-bores 65 providing a flow passage extending axially through the main portion of the piston, parallel to the central bore of the piston. The through-bores 65 are preferably formed in equal, spaced-apart relation around the main portion of the piston and extend from a forward axial end surface of the tubular main portion 62 to a rear axial end surface. The number and dimensions of the bores can vary depending upon the desired flow characteristics, as should be apparent to those skilled in the art. In any case, the through-bores 65 open into a cavity 65a defined by the enlarged rear portion 61 of piston 60, although the through-bores could also extend directly to the rear surface of the enlarged rear portion 61, if the cavity 65a was not provided (that is, if the central bore of the piston extended with constant diameter through the entire length of the piston).

A generally cylindrical poppet valve 66 is closely and slideably received within the central bore of the main portion 62. Poppet valve 66 includes a closed right end 67 having a radially-enlarged, conical outer surface which is engageable with a conical seat 68 on the valve body 39. A seal 69 on the valve 66 provides a seal between the valve 66 and valve seat 68. A pair of concentric coil springs 70, 71 engage the closed end of the valve 66 and a radially inwardly-extending shoulder 72 on the spool 40 and bias the valve toward the valve seat 68.

Valve body 39 is slidably mounted within the female housing 30, and the hydraulic fluid port 34 communicates with the interior of the tubular valve body 39 through ports 73 which are spaced circumferentially around the valve body. Seal 74 and 75 provide a seal between the valve body 39 and the female housing 30.

The locking balls 24 in the forward end of the valve body 39 are retained by a collar 77 which surrounds the locking balls and which can slide axially between radially-extending shoulder 78 on the female housing 30 and a retainer ring 79 which is positioned in an annular groove in the female housing 30. A coil spring 80 biases the collar 77 to the left. A seal 81 is positioned in an annular groove on the inside of the valve body 39 and is engageable with the male housing 19 when the male coupling is inserted into the female coupling.

Figure 2:
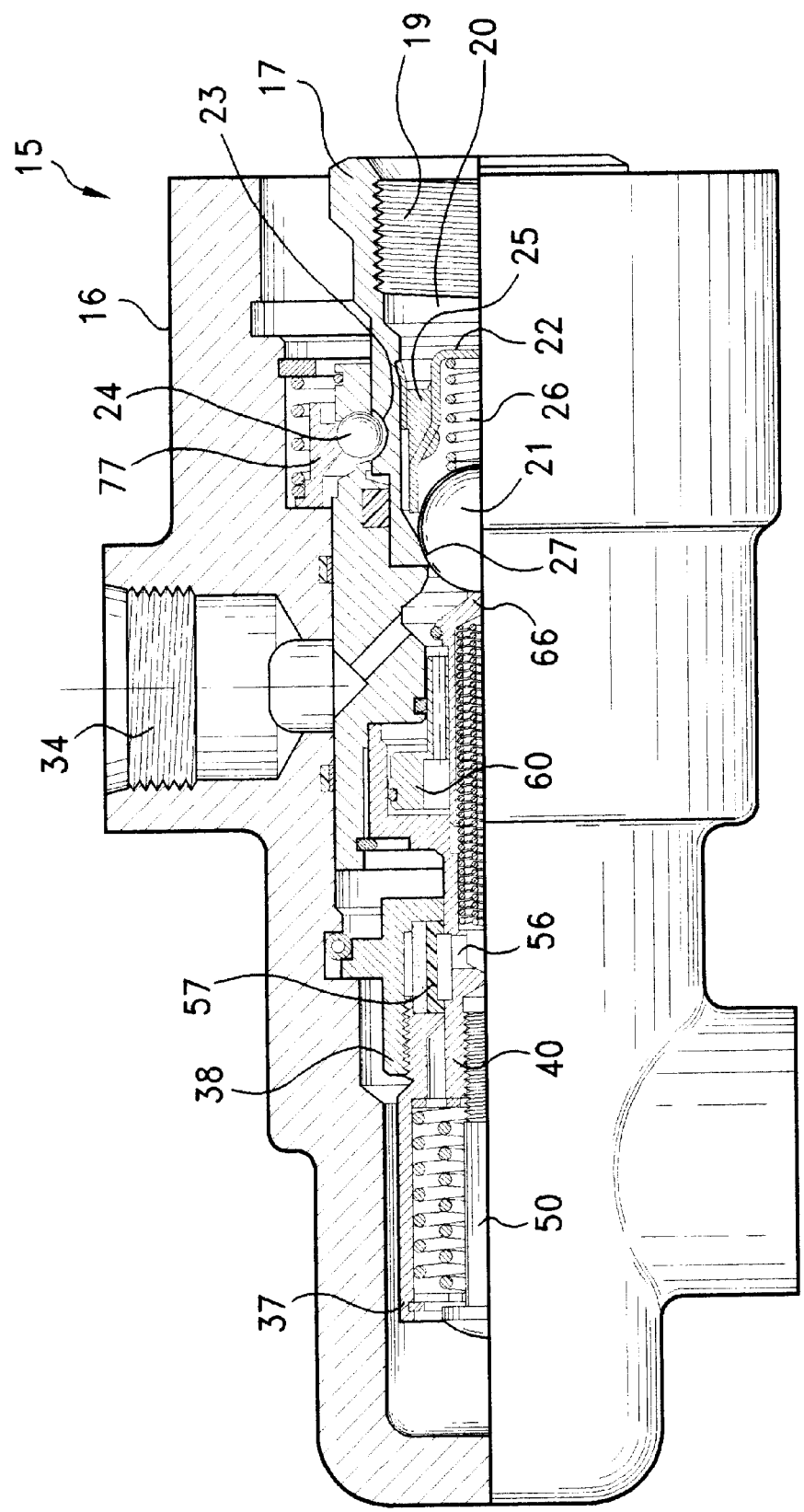
FIG. 2 is a view similar to FIG. 1, showing the male coupling fully inserted and latched in the female coupling, and the male check valve closed.

The operation of the quick disconnect coupling will now be briefly described. FIG. 1 shows the male coupling first inserted into the female coupling. The tractor hydraulic supply is connected to port 34. Ball 21 contacts the projection 67 of the closed forward end of valve 66. The forward end of the male housing 19 contacts seal 81. If the inside of the male coupling is pressurized by trapped hydraulic pressure, then the ball 21 forces the valve 66 to the left and also moves the valve body 39 and the spool 40 to the left against the force of springs 51 and 52 which are contained within sleeve 37. Seat 83 on the spool is likewise moved to the left of seal 57 and high pressure hydraulic fluid contained within spool 40 and valve 66 is dumped through ports 56 to atmosphere. The relieving of high pressure within valve 66 permits valve 66 to shift to the left against spring 70. Ball 21 of the male coupling remains closed due to the trapped high pressure in the male coupling. When the insertion force on the male coupling is removed, the coil springs 51, 52 within sleeve 37 move the valve body 39 of the female coupling and the male coupling to the right as shown in FIG. 2. The locking balls 24 are retained in the locking groove 23 in the male coupling by the collar 77, and the male coupling and female coupling are locked together.

In FIG. 2 the spool 40 is returned to its neutral, centered position, and the seal 57 closes the ports 56 in the spool 40 from atmospheric pressure.

Figure 3:
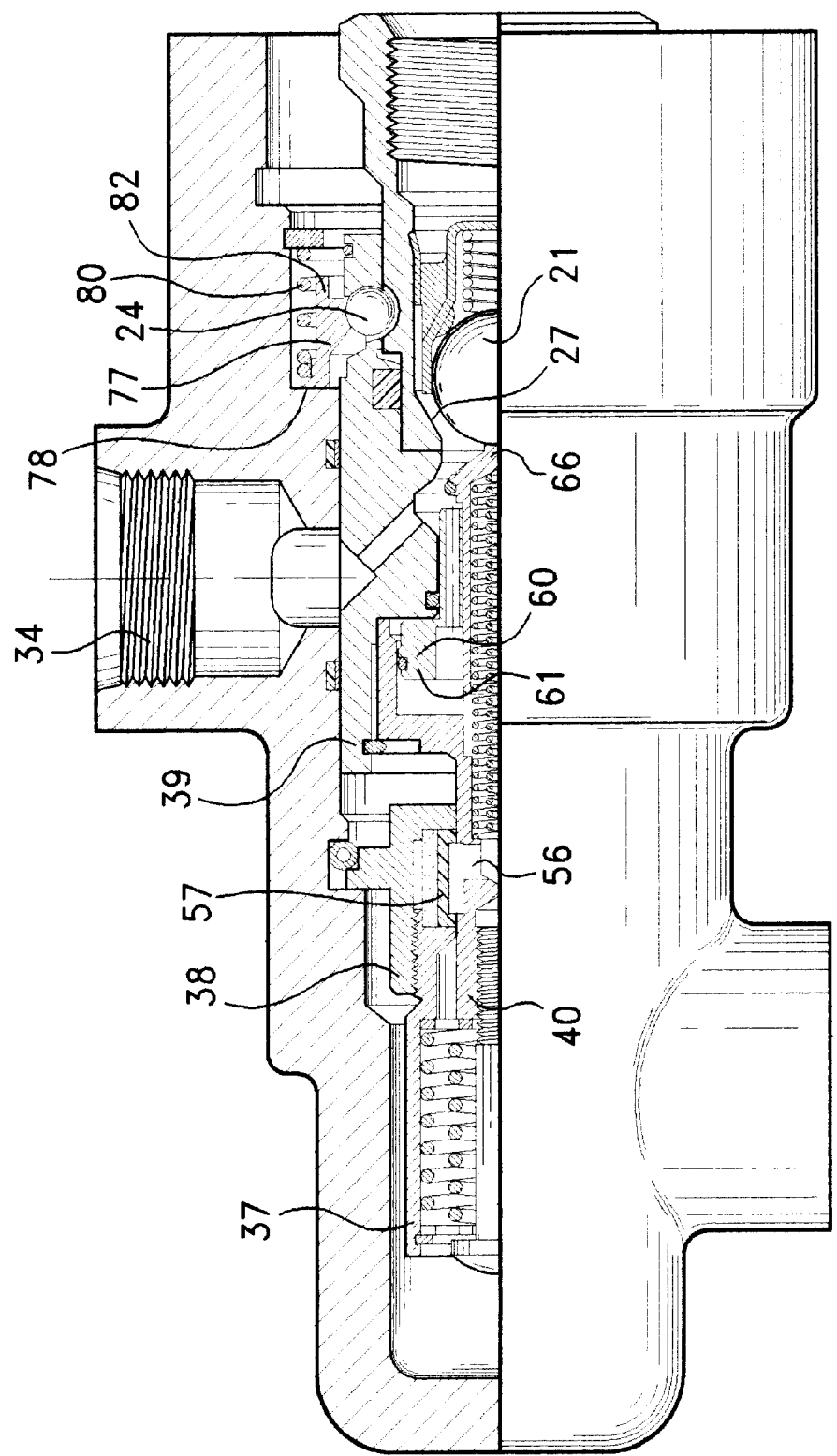
FIG. 3 is a view similar to FIG. 2, showing the female coupling pressurized and the male check valve open.

The tractor operator then repressurizes port 34 and the internal cavity of the valve 66 and spool 40 by operating the control valve on the tractor. Referring now to FIG. 3, the high pressure within the female coupling forces the ball 21 of the male coupling away from its seat 27 and opens the male coupling to the tractor hydraulic pressure.

If the trapped pressure in the male coupling exceeds the tractor pressure applied at port 34, the valve 66 will still force ball 21 open. This is accomplished by piston 60. The tractor pressure at port 34 is exerted on the radially enlarged end portion 61 of the piston by virtue of axial passages 65 through piston 60. The piston 60 then moves forwardly and engages the enlarged right end 67 of poppet valve 66 to assist in moving the poppet valve forwardly. Since the diameter of the end portion 61 of the piston is greater than the diameter of the ball 21, the ball 21 can be forced open even if the pressure within the female coupling is less than the trapped pressure within the male coupling.

When the couplings are to be disconnected, the control valve to port 34 is closed, and a pull force is applied to the male coupling which will shift the male coupling and the slidable internal components of the female coupling to the right from the FIG. 3 position. The locking collar 77 remains in locking engagement with the locking balls 24 because of the high friction between the collar and the balls which is caused by the internal pressure which applies a separating force on the male coupling and female coupling. As the collar 77 moves to the right with the male coupling, the spring 80 is compressed. The movement to the right of the valve body 39 and the spool 40 is sufficient to open the seal between the spool 40 and seal 57 which extends around the ports 56 and the spool. The pressure within spool 40 and valve 66 is thereby dumped to atmospheric pressure and the ball 21 of the male coupling closes by virtue of the high trapped pressure within the male coupling.

When the internal pressure within the female coupling is dumped to atmospheric pressure, the friction forces between the locking balls 24 and the locking collar 77 reduce to normal operating force levels. The internal parts of the female coupling continue to move to the right. The coil spring 80 around the locking collar returns the locking collar to its normal position, and the locking balls 24 are released from their locking position under collar 77, allowing the male coupling to be removed from the female coupling. At the time of disconnection, both the ball 21 of the male coupling and the valve 66 of the female coupling are closed. There is no release of pressure between the male and female halves during disconnection.

Figure 4:
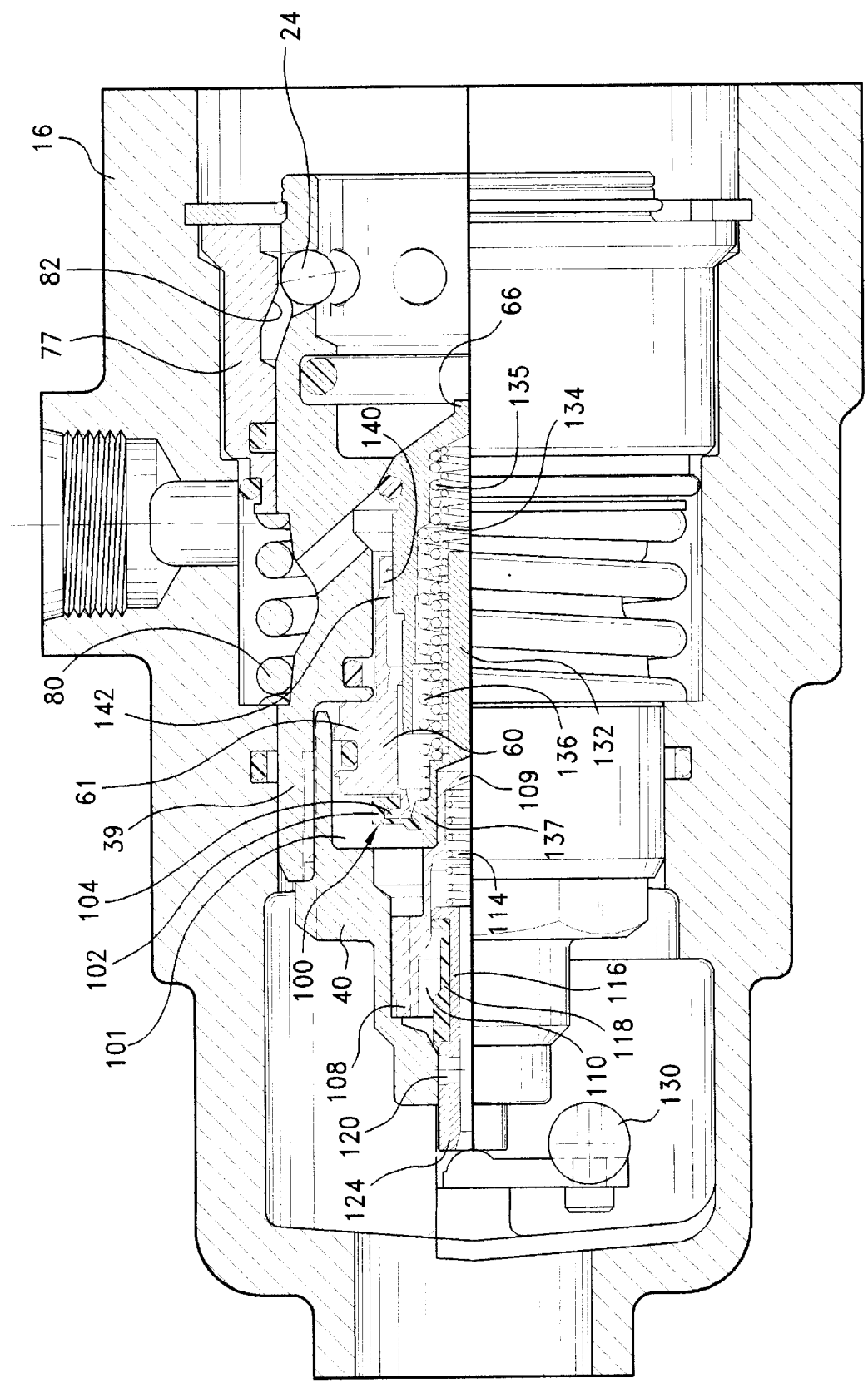
FIG. 4 is a side elevational view, partially in section, of female coupling formed in accordance with a further form of the present invention, prior to a male coupling being inserted.

Referring now to FIGS. 4–7, a further form of the present invention is shown, where the female coupling 16 includes a check valve mechanism, indicated generally at 100, to prevent fluid rapidly flowing from the piston cavity 101 of the female coupler during pressure imbalances in the system. For consistency, the same reference numerals will be used in FIGS. 4–7 to designate the same components as in FIGS. 1–3. Referring initially to FIG. 4, the check valve 100 includes an annular resilient wiper seal 102 supported on the rear surface of the enlarged portion 61 of piston 60. Preferably the seal is retained on an annular L-shaped flange 104 extending circumferentially around the end face of the piston, and has a sealing portion which projects radially inward therefrom.

A tubular poppet guide 108 is secured to valve spool 40 at the rear end of the valve body 39 and extends axially forward toward the poppet valve 66. The poppet guide 108 includes a closed forward end 109 defining an internal cavity 110. A series of flutes or channels 112 are formed axially along a portion of the guide and fluidly connect the cavity 101 behind the piston 60 with the internal cavity 110 of the poppet guide. A coil spring 114 is disposed in the cavity 110, and extends between forward end 109 and an inner tubular valve spool 116. Inner valve spool 116 retains cylindrical elastomeric seal 118, and is normally biased by spring 114 in a leftward direction in which the seal 118 seals against the outer spool 40 such that ports 120 formed in the inner spool 116 are sealed from the cavity of the female housing.

Inner valve spool 116 includes an engagement end 124 projecting from the rear end of the spool. The engagement end 124 is engageable by a lever-operated cam 130 to move inner valve spool 116 relative to outer spool 40, and hence allow fluid in the female housing to flow out through ports 120, as will be described herein in more detail.

A tubular relief poppet 132 surrounds the forward end of poppet guide 108 and extends axially forward into poppet valve 66. A set of three coil springs 134, 135, 136 surround relief poppet 132 and extend between relief poppet 132 and poppet valve 66. Springs 134–136 bias poppet valve 66 forwardly in the same manner as springs 70, 71 described above with respect to FIGS. 1–3. Relief poppet 132 includes a circumferential ridge 137 toward the rear end of the poppet. When the piston 60 is in the position illustrated in FIG. 4, wiper seal 102 engages ridge 137 to allow fluid to flow rearward (to the left in FIG. 4) through the coupling, but essentially prevents fluid flowing forward (to the right in FIG. 4) through the coupling. As such, wiper seal 102 operates as a simple one-way check valve when in engagement with ridge 137.

In this form of the invention, the piston 60 includes preferably at least one radially-extending passage 140 formed in tubular main portion 62, and an axially-extending annular passage 142 formed between the piston 60 and the poppet valve 66 to provide a flow path through the piston 60 to the rear surface of the enlarged portion 61. If multiple passages 140 are used, the passages again are preferably formed in equal, spaced-apart relation around the reduced diameter main portion 62. While the main portion 62 of piston 60 is closely surrounded by valve body 39 as described above with respect to FIGS. 1–3, the forward end (right end in FIG. 4) has a further reduced portion such that a flow gap is provided between the forward end of the main portion 62 of the piston and the valve body 39 for fluid flow into radial passage(s) 140. Alternatively, the piston could have the same structure as described previously with respect to FIGS. 1–3, that is, having only one axial passage extending entirely through the main portion 62 of piston 60. Again, as should be apparent to those skilled in the art, the dimension and number of passages 140, and dimension of axial flow passage 142, can vary depending upon the desired flow characteristics.

The remaining structure of the coupler illustrated in FIGS. 4–7 is the same as described previously with respect to FIGS. 1–3, and will not be further described for the sake of brevity.

Figure 5:
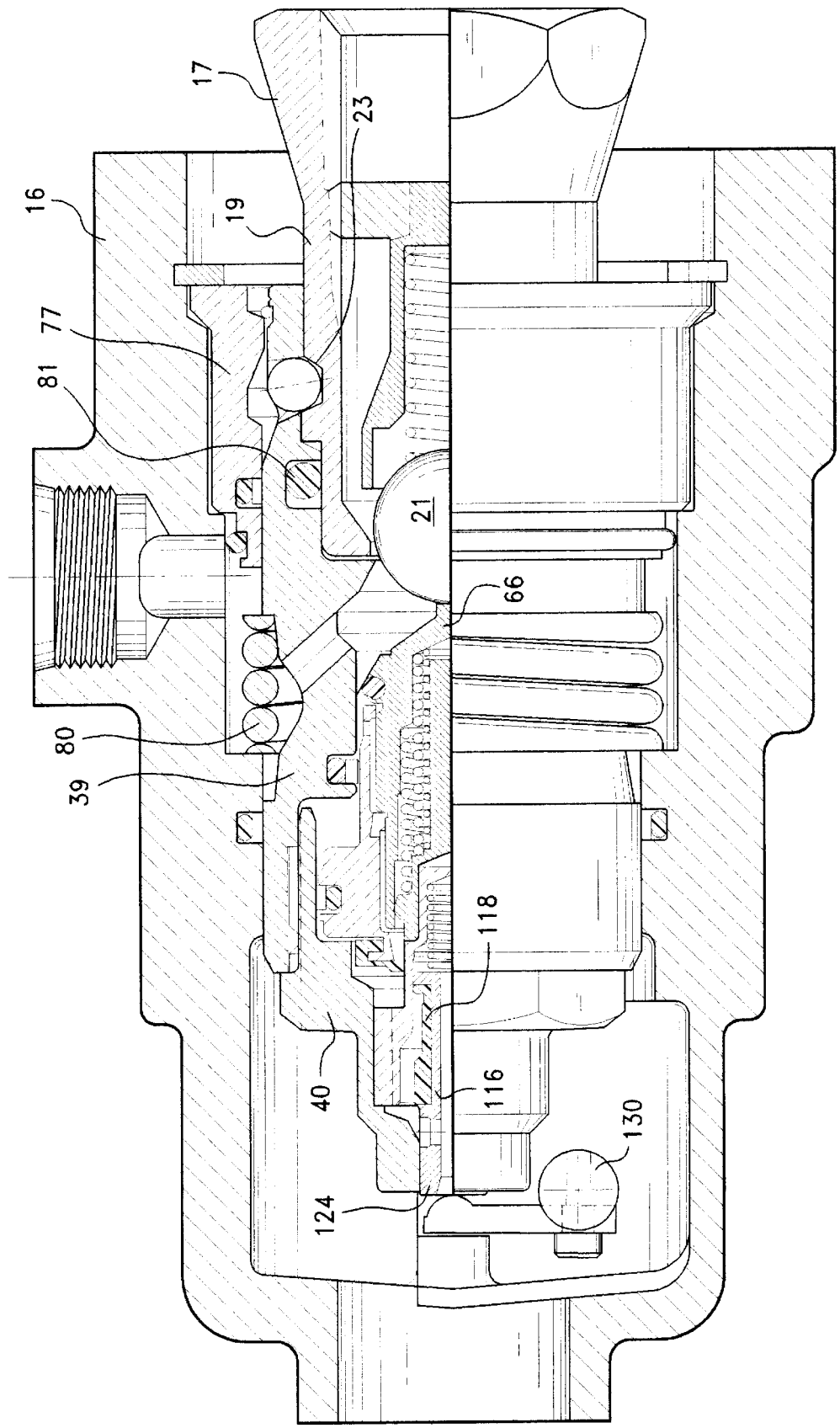
FIG. 5 is a view similar to FIG. 4, showing a male coupling fully inserted in the female coupling, and the male check valve closed.
Figure 6:
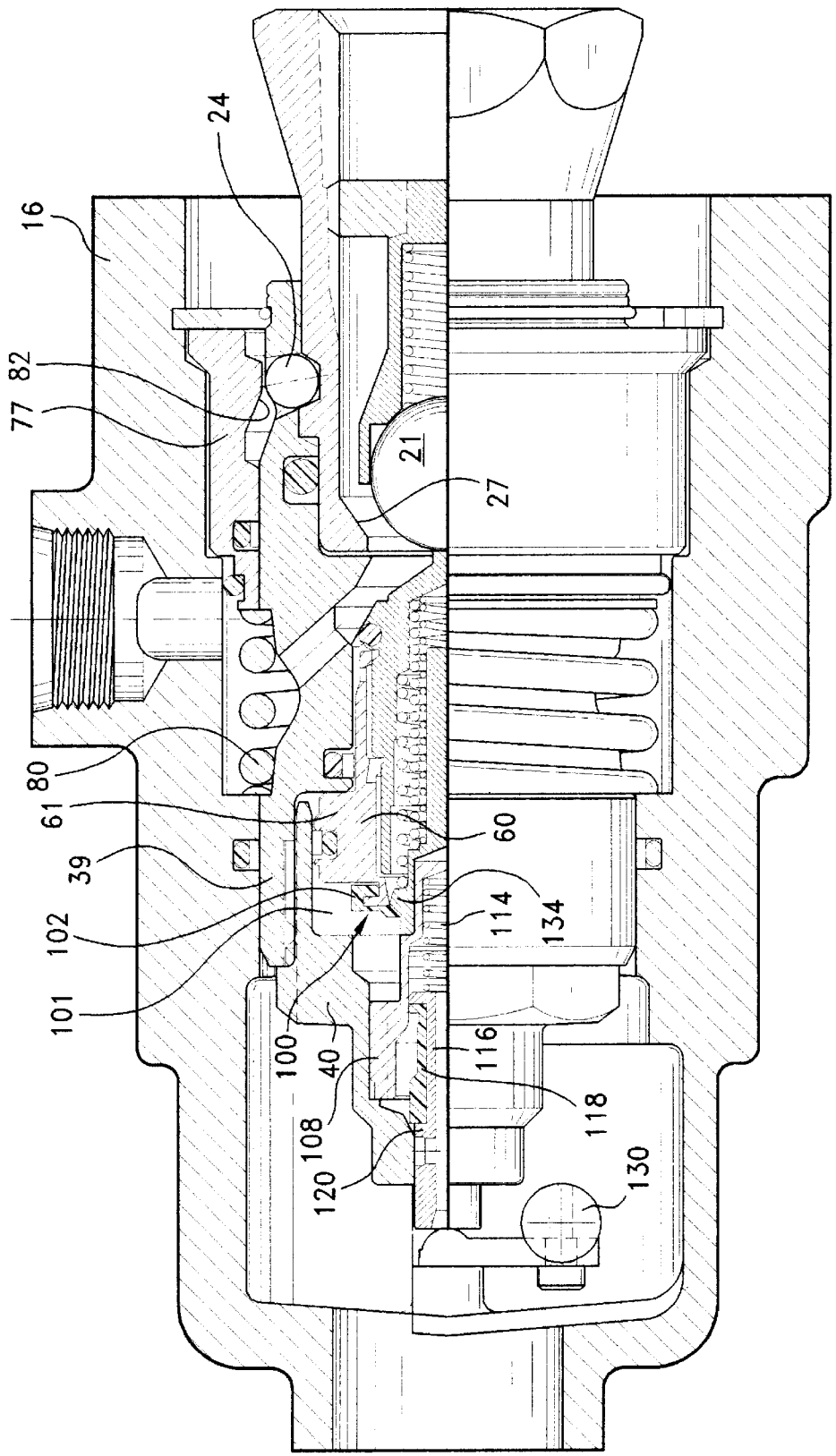
FIG. 6 is a view similar to FIG. 5, showing the male coupling latched in the female coupling, the female coupling pressurized and the male valve open.

The function of the coupling shown in FIGS. 4–7 will now be briefly described. Referring to FIG. 5, the tractor hydraulic supply is connected to port 34. When the male coupler 17 is inserted into female coupler 16, ball 21 contacts valve 66 and the forward end of the male housing 19 contacts seal 81. If the inside of the male coupling is pressurized by trapped hydraulic pressure, the ball 21 forces the valve 66 to the left and also moves the valve body 39 and the spool 40 to the left against the force of spring 114 which is contained within poppet guide 108. Upon rearward engagement of spool end 124 with cam 130, valve spool 116 is likewise moved to the right of spool 40 and high pressure hydraulic fluid contained within spool 40 and valve 66 is dumped through port 120 to atmosphere. The relieving of high pressure within valve 66 permits valve 66 to shift to the left against springs 134–136. Ball 21 of the male coupling remains closed due to the trapped high pressure in the male coupling. When the insertion force on the male coupling is removed, the coil spring 80 moves the valve body 39 of the female coupling and the male coupling to the right as shown in FIG. 6. The locking balls 24 are moved into the locking groove 23 in the male coupling by the locking collar 77, and the male coupling and female coupling are locked together.

In FIG. 6 the valve spool 116 is returned to its rearward position, and the seal 118 closes the piston cavity 101 from atmospheric pressure.

The tractor operator then repressurizes port 34 and the internal cavity of the valve 66 and spool 40 by operating the control valve on the tractor. The high pressure within the female coupling forces the ball 21 of the male coupling away from its seat 27 and opens the male coupling to the tractor hydraulic pressure.

If the trapped pressure in the male coupling exceeds the tractor pressure applied at port 34, the valve 66 will still force ball 21 open. The tractor pressure at port 34 is exerted on the radially enlarged end portion 61 of the piston by virtue of radial passage 140 and axial passage 142 through piston 60 and between piston 60 and poppet valve 66. Fluid flows through these passages and through check valve 100, that is, between wiper seal 102 and ridge 134, to the rear surface of the piston. The pressure drop across wiper seal 102 is minimal. The piston 60 then moves forwardly and engages the enlarged right end 67 of poppet valve 66 to assist in moving the poppet valve forwardly. Since the diameter of the end portion 61 of the piston is greater than the diameter of the ball 21, the ball 21 can be forced open even if the pressure within the female coupling is less than the trapped pressure within the male coupling.

If a pressure imbalance occurs within the female coupler, that is, if a vacuum suddenly appears within the male coupler, wiper seal 102 prevents fluid flow from the rear of the piston 60 from passing out through the forward end of the female coupler to the male coupler. This maintains the piston forwardly against the poppet valve and continues to urge the poppet valve against the check valve in the male coupler and keep the check valve in the male coupler in the open position. The fluid pressure behind the wiper seal 102 is relieved to allow the piston to move rearwardly when the seal 118 on the valve spool 116 relieves pressure in the female coupler during connect and disconnect.

When the couplings are to be disconnected, the control valve to port 34 is closed, and cam 130 is rotated to engage valve spool end 124, which will first shift valve spool 116 to the right against spring 114 to move seal 118 from engagement with spool 40 and open ports 120. Pressure within the female coupler will then be dumped to atmosphere. The pressure within spool 40 and valve 66 is thereby dumped to atmospheric pressure and the valve ball 21 of the male coupling closes by virtue of the high trapped pressure within the male coupling. Further movement of cam 130 will also shift the male coupling and the slidable internal components of the female coupling to the right from the FIG. 6 position. As the body 39 moves to the right with the male coupling, the spring 80 is compressed.

Figure 7:
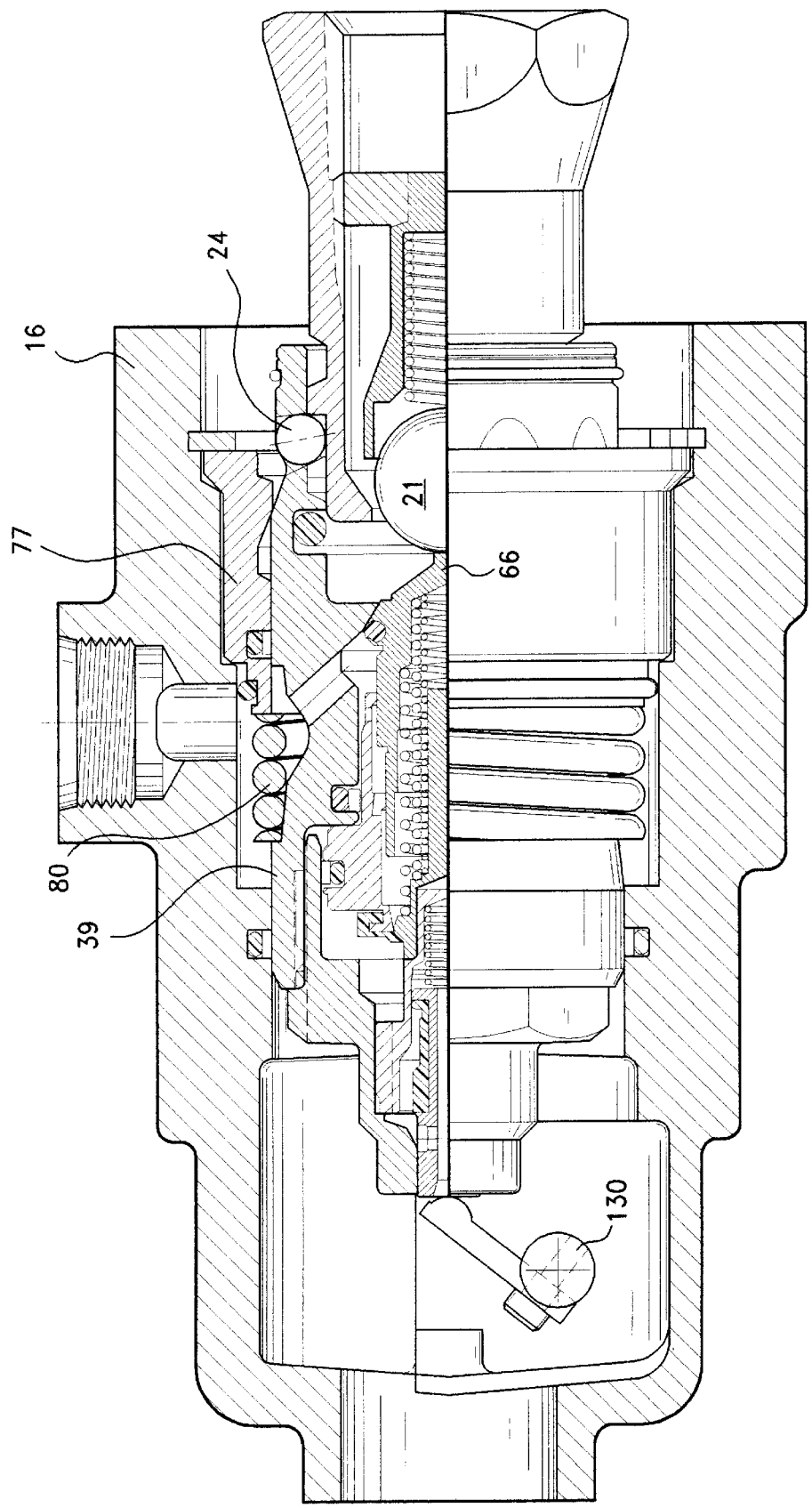
FIG. 7 is a view similar to FIG. 6, showing the coupling during disconnection.

Referring to FIG. 7, when the internal pressure within the female coupling is dumped to atmospheric pressure by rotating cam 130, the friction forces between the locking balls 24 and the locking collar 77 reduce to normal operating force levels. The internal parts of the female coupling continue to move to the right. The coil spring 80 around the body 39 is compressed, and the locking balls 24 are released from their locking position under collar 77, allowing the male coupling to be removed from the female coupling. At the time of disconnection, both the valve ball 21 of the male coupling and the valve 66 of the female coupling are closed. There is again no release of pressure between the male and female halves during disconnection.

As described above, the present invention provides a novel and unique quick disconnect type coupling which is particularly useful for hydraulic and pneumatic fluid lines. The disconnect coupling is reliable, serviceable and operates under a variety of conditions. The coupling has direct and uninterrupted fluid communication with the rear surface of the piston, which provides consistent and uniform operation of the coupler over a range of operating conditions. The check valve mechanism in the coupler is also simple, reliable, and operates consistency over a long operating cycle.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A female coupler, comprising:
    a housing having an internal bore with an open forward end adapted to receive a male coupler, a first port in the housing for supplying pressurized fluid to the bore,
    a valve body disposed in the bore and axially moveable in the housing, said valve body including a main cavity opening to the forward end of the housing bore, a peripheral inlet passage through the valve body communicating with the main cavity, and an interior valve seat in the valve body,
    a poppet valve disposed in the main cavity of the valve body and spring-biased against the valve seat to normally prevent fluid flow through the valve body, said poppet valve including a forward projection adapted to engage a check valve in the male coupler when the male coupler is received in the housing,
    a piston including a central bore receiving the poppet valve and slidably disposed between the poppet valve and the valve body, and including an internal flow passage extending from a forward axial end surface of the piston to a rearward axial end surface of the piston and radially outwardly disposed from the central bore to fluidly connect the inlet passage with a portion of the main cavity rearward of the piston and to an outer rear surface of the piston, said piston engaging the poppet valve when moved forward to assist in moving the poppet valve forwardly against excessive pressures in the male coupler.

2. The coupler as in claim 1, wherein said housing includes an axial outlet passage, and the internal flow passage also fluidly connects the inlet port to the outlet passage.

3. The coupler as in claim 1, wherein the poppet valve includes an enlarged end extending outwardly from a forward end of the poppet valve, said piston engaging the enlarged end to move the poppet valve forwardly.

4. The coupler as in claim 1, wherein the poppet valve includes an inner cavity facing rearward in the housing, and a spring is disposed in the poppet valve cavity and extends between the poppet valve and the housing to bias the poppet valve against the valve seat.

5. The coupler as in claim 1, wherein the piston includes a reduced diameter main portion closely receiving the poppet valve, and a radially enlarged end portion defining a cavity, the internal flow passage extending axially through the main portion and opening into the cavity in the end portion.

6. The coupler as in claim 5, wherein the internal flow passage extends axially through the entire main portion of the piston.

7. The coupler as in claim 1, wherein the internal flow passage extends parallel to the central bore of the piston.

8. A female coupler as in claim 1, wherein said internal flow passage in the piston is fluidly separate from the central bore and fluidly interconnects the inlet passage with the portion of the main cavity rearward of the piston and to the outer rear surface of the piston.

9. A female coupler, comprising:
    a cylindrical housing having an internal bore with an open forward end adapted to receive a male coupler, a first radial port in the housing for supplying pressurized fluid to the bore,
    a cylindrical valve body disposed in the bore and axially moveable in the housing, said valve body including a main cavity opening to the forward end of the housing bore, a peripheral inlet passage formed radially through the valve body communicating with the main cavity, and having an interior annular valve seat forwardly of the inlet passage,
    a cylindrical poppet valve disposed in the main cavity of the valve body, said poppet valve including an internal cavity, and a spring disposed in the internal cavity of the poppet valve and extending between the poppet valve and a portion of the housing to urge the poppet valve against the valve seat and normally prevent fluid flow through the valve body, said poppet valve also including a forward projection adapted to engage a check valve in the male coupler when the male coupler is received in the housing,
    a piston including a tubular main portion with a central bore closely receiving the poppet valve and slidably disposed between the poppet valve and the valve body, and a radially enlarged end portion, and further including an internal flow passage extending axially through the main portion from a forward end surface of the piston to a rearward end surface of the piston and radially outwardly disposed and fluidly separated from the central bore to fluidly connect the inlet passage with a portion of the main cavity rearward of the piston and to a rear surface of the piston, said piston engaging the poppet valve when moved forward to assist in moving the poppet valve forwardly against excessive pressures in the male coupler.

10. The coupler as in claim 9, wherein said housing includes an axial outlet passage, and the internal flow passage also fluidly connects the inlet port to the outlet passage.

11. The coupler as in claim 10, wherein the poppet valve includes an enlarged conical end extending outwardly from a forward end of the poppet valve, said piston engaging the enlarged end to move the poppet valve forwardly.

12. The coupler as in claim 11, wherein the radially enlarged end portion of the piston defines a cavity, the internal flow passage extending axially through the main portion and opening into the cavity in the end portion.

13. The coupler as in claim 12, wherein the internal flow passage extends axially through the entire main portion of the piston.

14. The coupler as in claim 13, wherein the internal flow passage extends parallel to the central bore of the piston.

15. A female coupler, comprising:
- a housing having an internal bore with an open forward end adapted to receive a male coupler, a first port in the housing for supplying pressurized fluid to the bore,
- a valve body disposed in the bore and axially moveable in the housing, said valve body including a main cavity opening to the forward end of the housing bore, a peripheral inlet passage through the valve body communicating with the main cavity, and having an interior valve seat forwardly of the inlet passage, said valve body also including a relief poppet and poppet guide assembly extending from a rear portion of the valve body axially forward,
- a poppet valve disposed in the main cavity of the valve body and spring-biased forwardly against the valve seat to normally prevent fluid flow through the valve body, said poppet valve including a forward projection adapted to engage a check valve in the male coupler when the male coupler is received in the housing,
- a piston including a central bore receiving the poppet valve and slidably disposed between the poppet valve and the valve body, and including a flow passage extending from a forward end of the piston to a rearward end of the piston and radially outwardly disposed and fluidly separated from the central bore to fluidly connect the inlet passage with a portion of the main cavity rearward of the piston and to a rear surface of the piston, said piston engaging the poppet valve when moved forward to assist in moving the poppet valve forwardly against excessive pressures in the male coupler, and further including a resilient one-way wiper seal carried by the piston and sealable against the relief poppet and poppet guide assembly to allow flow through the housing in the rearward direction to the rear surface of the piston, but to prevent flow in the forward direction.

16. The coupler as in claim 15, wherein the poppet valve includes an inner cavity facing rearward in the housing, and a spring is disposed in the poppet valve cavity and extends between the poppet valve and the housing to bias the poppet valve against the valve seat.

17. The coupler as in claim 15, wherein said piston includes a tubular main portion disposed between said poppet valve and said valve body, and said internal flow passage is formed radially through said tubular main portion.

18. The coupler as in claim 15, where said resilient wiper seal has an annular configuration, and is retained on the rear surface of the piston.

19. The coupler as in claim 18, wherein said rear surface of the piston includes a circumferentially extending flange, and said resilient wiper seal is retained and supported by said flange and projects radially inward therefrom.

20. The coupler as in claim 15, wherein said relief poppet and poppet guide assembly includes a radially-enlarged circumferentially-extending ridge, said resilient wiper seal sealing against said ridge, and said ridge and seal cooperating to prevent fluid flow in the forward direction through the housing.

* * * * *